United States Patent [19]
Yano et al.

[11] Patent Number: 5,608,702
[45] Date of Patent: Mar. 4, 1997

[54] DISC PLAYER CAPABLE OF CALCULATING THE TRAVEL TIME OF THE OPTICAL PICK-UP

[75] Inventors: Hideo Yano; Norio Tsunoda, both of Tokyo, Japan

[73] Assignee: Asahi Corporation, Japan

[21] Appl. No.: 605,851

[22] Filed: Feb. 23, 1996

[30] Foreign Application Priority Data

Feb. 24, 1995 [JP] Japan ................................. 7-037107

[51] Int. Cl.$^6$ ............................................. G11B 17/22
[52] U.S. Cl. ................................ 369/32; 369/33; 369/58
[58] Field of Search ............................. 369/32, 33, 54, 369/58, 44.26; 360/77.03, 77.02, 78.04, 78.11

[56] References Cited

U.S. PATENT DOCUMENTS

| 4,855,978 | 8/1989 | Kanamaru | 369/32 |
| 4,910,722 | 3/1990 | Kaji et al. | 369/32 |
| 5,088,075 | 2/1992 | Yokota | 369/32 |
| 5,315,568 | 5/1994 | Dente et al. | 369/32 |
| 5,337,296 | 8/1994 | Okubo | 369/32 |
| 5,438,557 | 8/1995 | Ito et al. | 369/44.28 |

FOREIGN PATENT DOCUMENTS 2077985  12/1981  United Kingdom ..................... 369/33

Primary Examiner—Tan Dinh
Attorney, Agent, or Firm—Ostrolenk, Faber, Gerb & Soffen, LLP

[57] ABSTRACT

A light pickup 4 is adapted to receive reflected light from a disc 1 and to input a signal into a determination means 12 while moving in the radial direction of the disc 1. The determination means 12 not only determines the current position of the light pickup but also calculates the time required for the light pickup 4 to move until reaching the signal-recording inner circular end of the disc, on the basis of the signal from the light pickup. The determination means 12 determines that no disc is set when there is no reflected light from the disc. The determination means 12 determines the size of the diameter of the disc 1 on the basis of the current position of the light pickup 4. The disc player has a structure in which it is not necessary to provide a switch for detecting the signal-recording inner circular end of the disc, a sensor for detecting the size of the diameter of the disc and a sensor for detecting whether or not the disc is set.

8 Claims, 3 Drawing Sheets

DISC PLAYER CAPABLE OF CALCULATING THE TRAVEL TIME OF THE OPTICAL PICK-UP

BACKGROUND OF THE INVENTION

1. Field of the Invention

The present invention relates to a disc player capable of conducting a playback of a disc memory medium (hereinafter referred to as "disc") for use in CD, LD, MD, CD-ROM, MO and the like. More particularly, the present invention is concerned with a disc player having unnecessitated a switch for detecting the signal-recording inner circular end of the disc, etc., to thereby enable simplifications of the structure and control thereof.

2. Discussion of Related Art

Generally, the disc player achieves a playback by having a light pickup read disc information upon the input of initialization signal. This playback is conducted by the move of the light pickup from the signal-recording inner circular end to the circumference of the disc in the radial direction of the disc. Therefore, the light pickup not only should reach the signal-recording inner circular end of the disc but also should detect the arrival at the signal-recording inner circular end prior to reading of information.

For meeting the above requirement, a switch capable of mechanically or optically detecting light pickup is disposed at a site inside the conventional disc player which corresponds to the signal-recording inner circular end of the disc, and the arrival of the light pickup at the signal-recording inner circular end of the disc is determined on the basis of the signal detected by the detection switch. Further, the disc player is provided with a set detecting sensor capable of checking the setting of the disc on the turn table and with a diameter determining sensor capable of detecting the size of the diameter of the disc, thereby having a structure capable of preventing malfunctions.

The conventional disc player is provided with the detection switch for detecting the arrival of the light pickup at the signal-recording inner circular end of the disc, so that not only is its structure complex but also it is required to accurately arrange the detection switch, thereby rendering the assembly thereof time-consuming. Moreover, the playback of the disc is conducted in accordance with the detection signal from the detection switch, so that not only is the control system complex but also appropriate detection signal cannot be outputted, for example, when the detection switch is in trouble or has suffered from dislocation. In this instance, there occur disadvantages such as the failure to playback the disc or the malfunctioning. In addition, the conventional disc player needs the sensor for detecting the setting of the disc, the sensor for determining the diameter of the disc, etc., which further renders the structure complex and renders the control system complicated.

SUMMARY OF THE INVENTION

The present invention has been made under the above circumstances.

It is therefore an object of the present invention to provide a disc player which unnecessitates a switch for detecting the move of the light pickup to the signal-recording inner circular end of the disc, thereby enabling not only simplifications of the structure and control system thereof but also prevention of malfunctioning.

It is another object of the present invention to provide a disc player which unnecessitates a sensor for detecting the setting of the disc, a sensor for determining the diameter of the disc, etc.

The foregoing and other objects, features and advantages of the present invention will become apparent from the following description and appended claims taken in connection with the accompanying drawings.

DETAILED DESCRIPTION OF THE INVENTION

Figure 1:
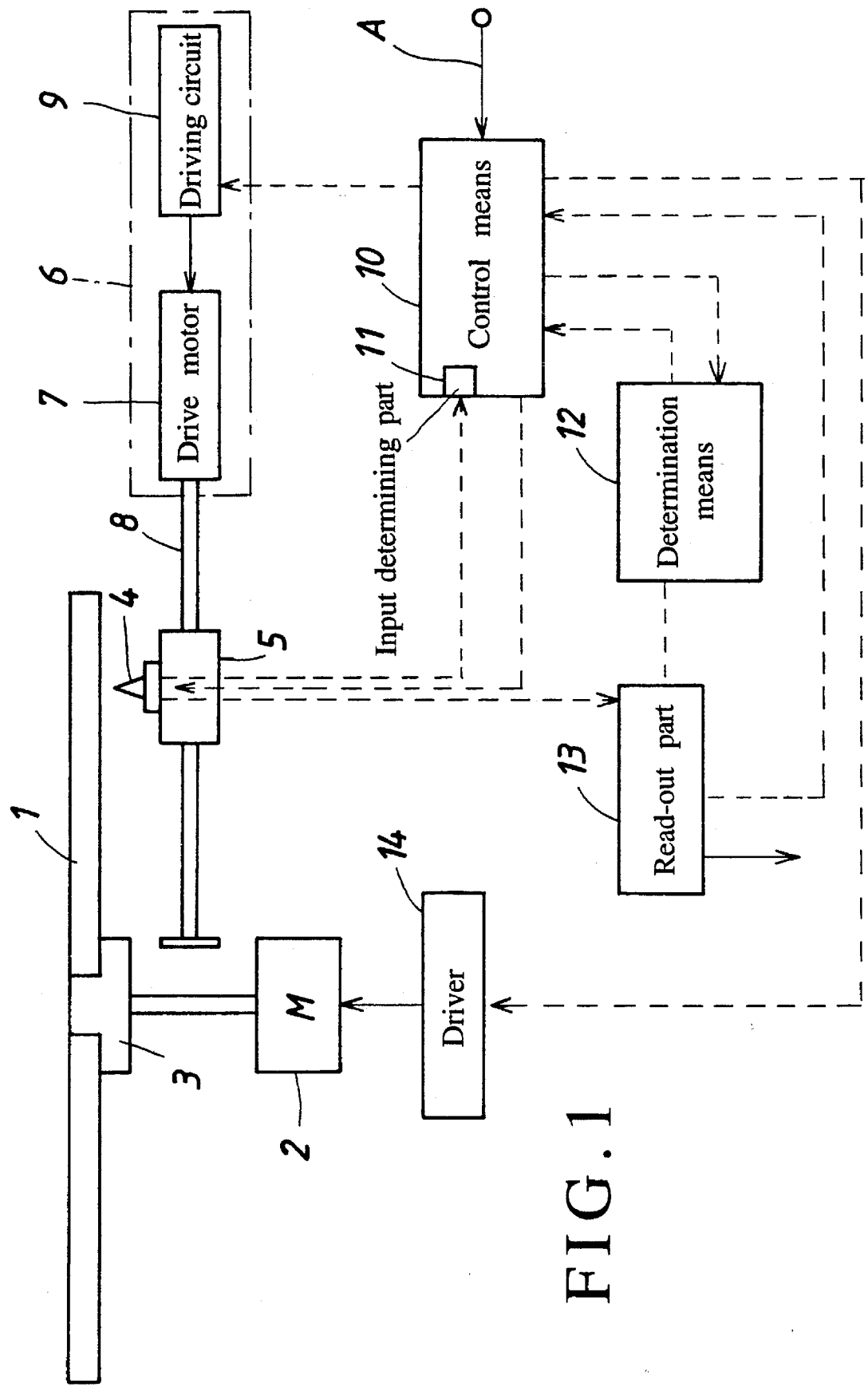
FIG.1 is a block diagram showing one embodiment of the present invention.

Essentially, according to the present invention, there is provided a disc player comprising:

a light pickup capable of emitting laser beam toward a disc and receiving laser beam reflected thereby;

a drive means for moving the light pickup in the radial direction of the disc;

a control means adapted to have an initialization signal inputted therein for controlling the light pickup and the drive means so that the light pickup is moved at a constant speed in the radial direction of the disc while emitting laser beam by the input of initialization signal; and a determination means for having, inputted therein, a signal fed from the light pickup while the light pickup is moving in accordance with the initialization signal, calculating a time required for the light pickup to move until reaching at least a signal-recording inner circular end of the disc on the basis of the inputted signal and outputting the calculated time to the control means.

In the above structure, the input of initialization signal causes the control means to control the drive means, so that the light pickup moves in the radial direction of the disc while emitting laser beam toward the disc. The laser beam emitted from the light pickup is reflected by the disc and received by the light pickup. The signal produced as a result of the receipt of laser beam is inputted in the determination means. The determination means calculates the time required for the light pickup to move until reaching the signal-recording inner circular end of the disc on the basis of the above data, and the control means causes the light pickup to move on the basis of the calculated time. Thus, the light pickup certainly reaches the signal-recording inner circular end of the disc. In the above structure the light pickup's reaching the signal-recording inner circular end is attained only by the signal from the light pickup, thereby unnecessitating a detection switch and enabling simplification of the control system.

In the present invention, the control means executes a control for the light pickup to temporarily move toward the circumference of the disc at an early stage of the input of initialization signal and thereafter executes a control for the light pickup to move toward the signal-recording inner circular end of the disc in accordance with the result of determination of the determination means. The position of the light pickup is not known at an early stage of the input of initialization signal, so that the light pickup is caused to temporarily move toward the circumference of the disc. When the light pickup does not receive reflected light (signal) from the disc for a given period of time during the above move toward the circumference or the signal-recording inner circular end of the disc, this is the instance in which the disc is not set on the turn table. In this instance, the determination means determines that the disc is not yet set. Therefore, it is not necessary to dispose a detection sensor for detecting whether or not the setting of the disc is carried out.

On the other hand, when the disc receives reflected light from the disc during the temporary move of the light pickup toward the circumference of the disc or the subsequent move thereof toward the signal-recording inner circular end of the disc, the determination means detects the setting of the disc and simultaneously determines the current position of the light pickup on the basis of the signal from the light pickup. Further, the determination means compares the thus determined current position of the light pickup with the previously set diameter of the disc and determines the size of the diameter of the disc on the basis of comparison result. Therefore, it is not necessary to provide a sensor for determining the diameter of the disc.

EFFECT OF THE INVENTION

As apparent from the foregoing, in the present invention, the light pickup is moved toward the signal-recording inner circular end of the disc on the basis of the signal thereof produced while moving the light pickup in the radial direction of the disc. Therefore, it is not necessary to provide a switch for detecting the signal-recording inner circular end of the disc, so that the structure of the disc player is simplified to thereby not only minimize apparatus trouble and malfunctioning but also simplify the control system. Moreover, the diameter of the disc and/or the setting of the disc can be detected by the signal produced while moving the light pickup. Therefore, it is not necessary to provide sensors for detecting these, so that the structure and control system of the disc player can be further simplified.

PREFERRED EMBODIMENT OF THE INVENTION

The present invention will be illustrated in greater detail with reference to the following Example, which should not be construed as limiting the scope of the invention.

EXAMPLE

FIG.1 shows the configuration of one embodiment of the present invention.

A turn table 3 is secured to the rotating shaft of a disc motor 2. A disc 1 is set on the turn table 3. The lower side of the disc 1 is a signal recording surface. A light pickup 4 adapted to emit laser beam toward the signal recording surface is arranged below the disc 1.

The light pickup 4 is secured to a movable carriage 5 and is capable of not only emitting laser beam toward the disc 1 but also receiving laser beam reflected by the disc 1 to thereby convert the same to an electrical signal. The movable carriage 5 reciprocates at a constant speed in the radial direction of the disc 1, so that also the light pickup 4 reciprocates integrally therewith in the same direction at a constant speed. These reciprocating movements are carried out by the driving of a drive means 6.

In the illustrated example, the drive means 6 is provided with a drive motor 7 such as a servomotor, a feed screw 8 secured to the drive motor 7 and adapted to rotate and a driving circuit 9 capable of controlling the driving of the drive motor 7. The feed screw 8 passes through the movable carriage 5 in threadedly engaging relationship. Thus, normal and reverse rotations of the feed screw 8 cause the movable carriage 5 to reciprocate at a constant speed in the radial direction of the disc 1. In this instance, the functioning of the driving circuit 9 is controlled by the below described control means 10. Further, the drive means 6 is not limited to the illustrated structure as long as the light pickup 4 can be moved in the radial direction of the disc 1. For example, another structure can be employed in which use is made of a pulley and a timing belt to thereby convert the driving power of the drive motor to the moving power of the light pickup.

The light pickup 4 is connected via a connection member such as a flexible cable (not shown) to the control means 10. The control means 10 controls the emission of laser beam toward the disc 1. The light pickup 4 converts light reflected by the disc 1 to an electrical signal and outputs it to the control means 10 at an early stage of the input of initialization signal A to the control means 10. Numeral 11 denotes an input determination part in which an electrical signal based on the above reflected light is inputted and which constitutes a part of a determination means 12 described later.

Numeral 13 denotes a read-out part in which the electrical signal from the light pickup 4 is inputted and which reads information recorded on the disc 1 on the basis of this electrical signal. The read information is fed to a playback element (not shown) where the information is playbacked. The read information is outputted to the determination means 12 in advance, namely, prior to the information playback.

The determination means 12 determines the current position of the light pickup 4 relative to the disc 1 with the input of read signal from the read-out part 13, calculates the time required for the light pickup 4 to move until reaching the signal-recording inner circular end of the disc 1 as described later on the basis of the thus determined current position data and outputs the time to the control means 10. The control means 10 controls the drive motor 7 by means of the driving circuit 9 on the basis of the outputted time to thereby move the light pickup 4 toward the signal-recording inner circular end of the disc 1. Thus, the state of initialization is terminated, and the normal reading of the disc 1 is started.

In addition to the above function, the determination means 12 determines the size of the diameter of the disc 1 from the data of the current position of the light pickup 4 as described later. The control means 10 outputs a control signal to a driver 14 of the disc motor 2 to thereby control so as for the disc 1 to rotate at a given number of revolutions and outputs the number of revolutions to the determination means 12.

Figure 2:
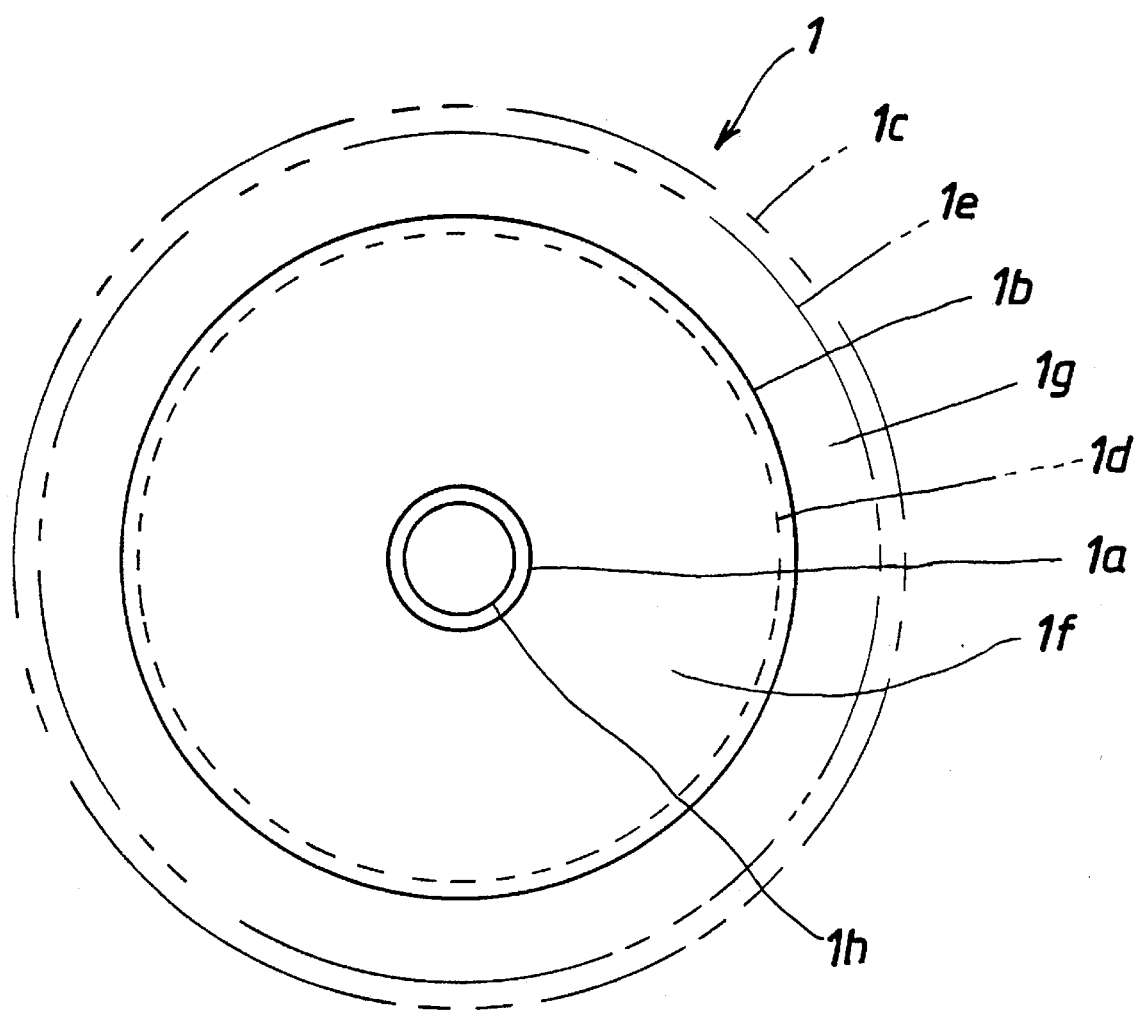
FIG.2 is a plan of a disc.

The operation of the disc player having the above structure according to this Example will be described below. FIG. 2 shows the disc 1 and numeral 1a denotes the signal-recording inner circular end of the information recording part on which information has been recorded. The light pickup 4, prior to the start of disc playback, reaches the signal-recording inner circular end 1a of the disc 1 and thereafter moves in the radial direction toward the circumference of the disc 1. During the move, the light pickup 4 reads the information of the disc 1. Numeral 1b denotes the circumferential edge of disc with a small diameter (e.g., diameter of 8 cm) and numeral 1c the circumferential edge of disc with a large diameter (e.g., diameter of 12 cm). Mirror parts 1d, 1e having no information recorded thereon are respectively provided on the signal-recording inner circular end sides of the circumferential edges 1b, 1c of the discs with the above diameters. Information recording parts 1f, 1g are provided on the further signal-recording inner circular end sides of the mirror parts 1d, 1e. Incidentally, numeral 1h is a set hole formed at the center of the disc 1.

Figure 3:
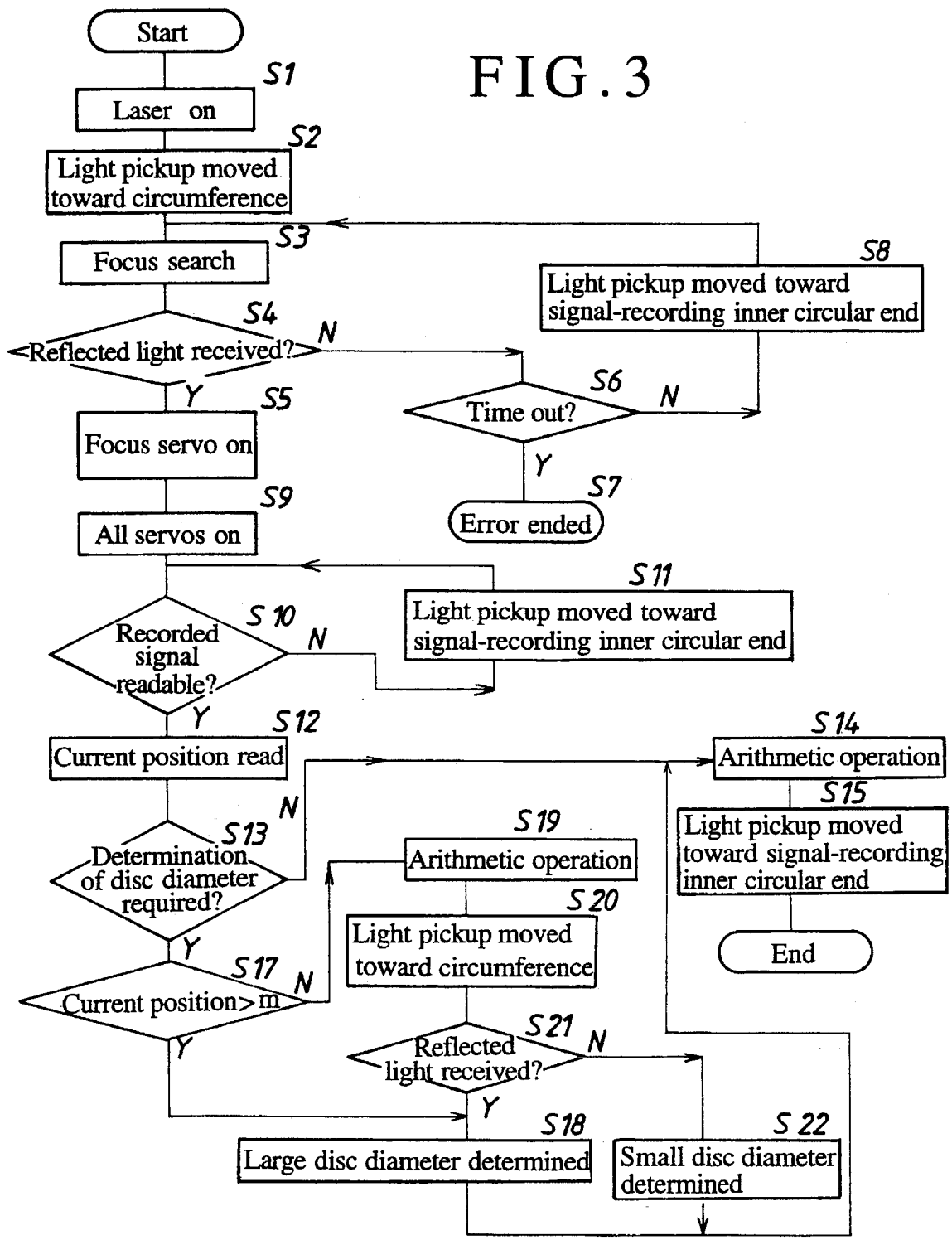
FIG.3 is a flow chart showing operations conducted according to one embodiment of the present invention.

FIG. 3 is a flow chart showing operations conducted at the time of initialization according to this Example. This flow chart not only moves the light pickup 4 toward the signal-recording inner circular end of the disc 1 but also determines whether or not the disc 1 is set on the turn table 3 and the size of the diameter of the set disc 1. This flow chart is started when the initialization signal A has been inputted in the control means 10 and the disc motor 2 is rotated at a given number of revolutions on the basis of the initialization signal A.

The control means 10 outputs a control signal to the light pickup 4 so as to cause the light pickup 4 to emit laser beam (step S1). Then, the control means 10 outputs a control signal to the driving circuit 9 so that the movable carriage 5 is temporarily moved toward the circumference of the disc 1 so as to move the light pickup 4 integrally therewith in the same direction (step S2). The move toward the circumference of the disc 1 at an early stage of the input of the initialization signal is conducted for a given period of time (e.g., 0.5 sec). After this move, the light pickup 4 conducts a focus search and the signal thereof is outputted to an input determining part 11 of the control means 10 (step S3).

The input determining part 11 determines whether or not the reflected light from the disc 1 is incident on the light pickup 4 on the basis of that signal (step S4). This step S4 does not read the information recorded on the disc 1 but determines only whether or not the light pickup 4 receives the reflected light from the disc 1. When the light pickup 4 receives the reflected light from the disc 1, an advance is made to step S5. On the other hand, when the light pickup 4 does not receive the reflected light, an advance is made to step S6.

The step S6 determines whether or not the state of not yet receiving the reflected light from the disc 1 is continued for a given period of time. When the state of not yet receiving the reflected light has been continued for a given period of time or longer, the input determining part 11 determines that the disc 1 is not set on the turn table 3 and, in accordance with this determination, the control means 10 outputs a warning to that effect, terminates the state of initialization and waits for the input of next initialization signal (step S7). This structure detects whether or not the disc 1 is set on the basis of the signal from the light pickup 4, so that a sensor for detecting whether or not the setting is effected is rendered unnecessary. Thus, the number of parts can be reduced, the structure of the disc player can be simplified and the control thereof can be facilitated.

On the other hand, when the reflected light from the disc 1 is received within a given period of time, the input determining part 11 determines that the disc 1 is set on the turn table 3. Thus, the control means 10 moves the light pickup 4 toward the signal-recording inner circular end of the disc 1 (step S8), and the step returns to Step 3 and goes to Step S5.

The Step S5 is a step subsequent to having found that the disc 1 is set on the turn table 3. The control means 10 brings a focus servo of the light pickup 4 to the state of being on. Thereafter, in step S9, other servo controls such as a tracking servo and a servo of disc motor are brought to the state of being on.

The above servo control being brought to the state of being on enables the light pickup 4 to read the information recorded on the disc 1, and whether or not the reading of the information is feasible is determined by the determination means 12 (step S10). In this stage, the signal of the light pickup 4 is outputted to the read-out part 13 and the result is outputted from the read-out part 13 to the determination means 12. When the read-out part 13 has read the information of the disc 1 on the basis of the signal of the light pickup 4, the step goes to step S12. On the other hand, when the read-out part 13 does not read the information, the step goes to step S11. When the read-out part 13 does not read the information of the disc 1, the light pickup 4 is not on the position corresponding to the information recording part if or 1g of the disc 1, namely, is at the site corresponding to the mirror part 1d or 1e. Thus, the control means 10 further moves the light pickup 4 toward the signal-recording inner circular end of the disc 1 (step S11) and the step returns to the step S10.

On the other hand, when the information of the disc 1 has been read in the step S10, the determination means 12 determines the current position of the light pickup 4 relative to the disc 1. This determination is conducted as follows when the disc 1 is CD. Illustratively, in CD, the read information includes information on time, so that the current position of the light pickup 4 is calculated from the information on time.

The step goes after determination of the current position of the light pickup 4 relative to the disc 1 to step S13, in which whether or not the determination of the diameter of the disc 1 is required is decided. When it is required, the step goes to step S17. On the other hand, when it is not required, the step goes to step S14. The step S14 is an instance in which the diameter of the disc 1 has already been inputted or only the disc 1 with a single diameter is employed. In either instance, the diameter of the disc 1 is data already known. In the step S14, the determination means 12 calculates the time required for the light pickup 4 to move until reaching the signal-recording inner circular end of the disc 1. This operation is executed by calculating the time proportional to the result thereof on the basis of the data of the current position of the light pickup 4 relative to the disc 1, which current position has been determined in the step S12. The determination means 12 outputs the thus calculated moving time to the control means 10. The control means 10 controls the driving circuit 9 on the basis thereof and moves the light pickup 4 toward the signal-recording inner circular end of the disc 1 just for that time (step S15). Thus, the light pickup 4 reaches the signal-recording inner circular end 1a of the disc 1, so that the state of initialization is terminated (step S16) with the result that the playback of the information of the disc 1 is started.

On the other hand, when the determination of the diameter of the disc 1 is required, the step goes to step S17. In the step S17, the determination means 12 compares the data of the current position of the light pickup 4 having been determined in the step S12 with m which is the data of circumferential position of the disc with the minimum diameter among the disc varieties employed in the disc player. When the data of current position is found to be greater than m as a result of this comparison, the determination means 12 determines that use is made of a disc with large diameter (step S18). Thereafter, the step goes to the step S14.

In contrast, when the data of the current position of the light pickup 4 is smaller than m, the step goes to step S19. In the step S19, the determination means 12 executes the arithmetic operation (m–the current position) on the basis of the data of the current position of the light pickup 4 and the value of m, calculates the moving time proportional to the result of the arithmetic operation and outputs the calculated time to the control means 10. Thus, the control means 10 controls the driving circuit 9 to thereby move the light pickup 4 toward the circumference of the disc 1 just for that time (step S20). The input determining part 11 determines whether or not the light pickup 4 has received the reflected light from the disc 1 as a result of this move toward the circumference of the disc 1 (step S21). When the reflected light is received, the determination means 12 determines that the disc 1 has a large diameter (step S18). On the other hand, when the light pickup 4 does not receive the reflected light from the disc 1, the determination means 12 determines that the disc 1 has a small diameter (step S22). Thus, the diameter of the disc 1 is determined, so that the step goes from the step S18 and step S22 to the step S14, the same arithmetic operation as above is conducted and thereafter the light pickup 4 moves to the signal-recording inner circular end of the disc 1 (step S15), thereby terminating the state of initialization (step S16).

Therefore, in this Example, the light pickup can securely reach the signal-recording inner circular end of the disc wherever it is located. Thus, it is not necessary to provide a detection switch for detecting the arrival at the signal-recording inner circular end of the disc, so that not only is the structure of the disc player simplified but also the assembly thereof is facilitated. Further, in this Example, the size of the diameter of the disc is also determined, so that it is not necessary to provide a determination sensor therefor, thereby attaining a further simplification of the structure of the disc player.

The present invention is never limited to this Example and various modifications can be made. For example, in this Example, the structure of the disc player can satisfactorily be simplified by moving the light pickup to the signal-recording inner circular end of the disc, so that the determinations of the diameter of the disc and the setting of the disc can be avoided.

What is claimed is:

1. A disc player comprising:

a light pickup capable of emitting laser beam toward a disc and receiving laser beam reflected thereby;

a drive means for moving the light pickup in the radial direction of the disc;

a control means adapted to have an initialization signal inputted therein for controlling the light pickup and the drive means so that the light pickup is moved at a constant speed in the radial direction of the disc while emitting laser beam by the input of initialization signal; and a determination means for having, inputted therein, a signal fed from the light pickup while the light pickup is moving in accordance with the initialization signal, calculating a time required for the light pickup to move until reaching at least a signal-recording inner circular end of the disc on the basis of the inputted signal and outputting the calculated time to the control means.

2. The disc player according to claim 1, wherein the control means is adapted to control the drive means so that the light pickup is temporarily moved toward a disc circumference at an initial stage of the input of the initialization signal.

3. The disc player according to claim 1, wherein the determination means is adapted to determine that no disc is set when no signal is inputted thereinto for a given period of time from the light pickup during the temporary move of the light pickup effected by the control means toward the disc circumference.

4. The disc player according to claim 3, wherein the determination means is adapted to make the determination on the basis of whether or not the light pickup is receiving reflected light from the disc.

5. The disc player according to claim 1, wherein the determination means is adapted to determine whether or not the light pickup is located at a position corresponding to an information recording part of the disc on the basis of the signal from the light pickup.

6. The disc player according to claim 1, wherein, when the light pickup is determined as locating at the position corresponding to the information recording part of the disc in accordance with claim 5, the determination means is adapted to determine a current position of the light pickup relative to the disc on the basis of the signal from the light pickup and thus to determine the size of the diameter of the disc on the basis of the determined value.

7. The disc player according to claim 4, wherein the determination means is adapted to make the determination on the basis of whether or not the information recorded on the disc is read.

8. The disc player according to claim 5, wherein the determination means is adapted to make the determination on the basis of whether or not the information recorded on the disc is read.

* * * * *